United States Patent
Ario et al.

(10) Patent No.: US 6,576,172 B1
(45) Date of Patent: Jun. 10, 2003

(54) METHOD OF MANUFACTURING SOUND-PROOF PRODUCTS

(75) Inventors: Toshiyuki Ario, Kariya (JP); Takashi Naka, Kariya (JP); Junichi Hishida, Kariya (JP); Tetsuyasu Akita, Kariya (JP); Masaru Suzuki, Kariya (JP); Yasushi Tsujita, Toyota (JP); Takuji Kajihara, Toyota (JP)

(73) Assignee: Toyoda Boshoku Corporation, Kariya (JP)

( * ) Notice: Subject to any disclaimer, the term of this patent is extended or adjusted under 35 U.S.C. 154(b) by 111 days.

(21) Appl. No.: 09/637,902

(22) Filed: Aug. 14, 2000

(30) Foreign Application Priority Data

| Aug. 24, 1999 | (JP) | 11-236280 |
| Aug. 24, 1999 | (JP) | 11-236305 |
| Aug. 24, 1999 | (JP) | 11-236327 |
| Aug. 24, 1999 | (JP) | 11-236356 |
| Sep. 6, 1999 | (JP) | 11-251062 |

(51) Int. Cl.⁷ .......................... B29C 43/02; B29C 43/58
(52) U.S. Cl. ................... 264/40.3; 264/37; 264/121; 264/122
(58) Field of Search .................. 264/50, 37.3, 122, 264/40.3, 121

(56) References Cited

U.S. PATENT DOCUMENTS

| 4,182,649 | A | * | 1/1980 | Isgur et al. ............... 162/101 |
| 4,683,246 | A | * | 7/1987 | Davis et al. ............... 521/54 |
| 5,566,888 | A | | 10/1996 | Yamamoto |
| 5,609,816 | A | * | 3/1997 | Thoma et al. ............. 264/122 |
| 5,658,511 | A | | 8/1997 | Nicolay |

FOREIGN PATENT DOCUMENTS

| DE | 41 28 927 A1 | 3/1993 |
| EP | 0 894 885 A2 | 2/1999 |
| EP | 0 896 079 A1 | 2/1999 |
| JP | 07009447 | 1/1995 |
| JP | 07323426 | 12/1995 |
| JP | 08112584 | 5/1996 |
| JP | 8-112584 | 5/1996 |
| JP | 11-192635 | 7/1999 |

* cited by examiner

*Primary Examiner*—Allan R. Kuhns
(74) *Attorney, Agent, or Firm*—Oliff & Berridge, PLC

(57) ABSTRACT

A processed material in which a fibrous binder is mixed with chip-like solid matters such as soft urethane foam is quickly injected into a preform mold having a flat molding surface with a uniform filling density, and then fed to a main mold having a molding surface whose shape corresponds to that of a sound-proof product to be formed, so that main molding is performed under sufficient pressure and heat. With the main molding carried out after the preform molding, it is possible to manufacture sound-proof products of excellent quality.

19 Claims, 3 Drawing Sheets

METHOD OF MANUFACTURING SOUND-PROOF PRODUCTS

INCORPORATION BY REFERENCE

The disclosures of Japanese Patent Application Nos. HEI 11-236280 filed on Aug. 24, 1999, HEI 11-236305 filed on Aug. 24, 1999, HEI 11-236327 filed on Aug. 24, 1999, HEI 11-236356 filed on Aug. 24, 1999 and HEI 251062 filed on Sep. 6, 1999 including the specification, drawings and abstract are incorporated herein by reference in their entirety.

BACKGROUND OF THE INVENTION

1. Field of the Invention

The present invention relates to a method for manufacturing a sound-proof product, and more particularly to a method for manufacturing a sound-proof product in which a processed material as a mixture of chip-like solid matters made of a lightweight material and a thermoplastic fibrous binder is injected with the air into a mold so as to fill the mold, and the sound-proof product is molded or shaped by hot press. This invention is also concerned with a sound-proof product manufactured by the above method.

2. Description of the Related Art

The present invention is particularly preferably applicable to sound-proof products using non-metallic shredder residue composed of, for example, wastes of vehicles, as a recycled material, and also preferably applicable to sound-proof products, such as dash silencers or floor silencers, for use in vehicles.

As a prevailing technique for manufacturing sound-proof products, such as dash silencers or floor silencers for vehicles, having a reduced volume density and excellent sound-proof and vibration damping/isolating capabilities, chip-like solid matters made of a lightweight material and a thermoplastic fibrous binder are mixed with each other, and introduced into a mold of hot press type in which press molding of a sound-proof product is performed.

In this case, it is particularly economical and meaningful in terms of recycling to effectively use non-metallic shredder residue extracted from, for example, wastes of vehicles, as chip-like solid matters of a lightweight material.

In the technology of manufacturing sound-proof products, typical methods of introducing the above mixture (processed material) into a mold include a method as disclosed in Japanese Laid-open Patent Publication No. 8-112584 in which the processed material is deposited in the form of a sheet, and brought into a cavity between the upper and lower sections of the mold, and a method in which the processed material is injected with the air into a mold so as to fill the mold. The latter method is considered as more useful in view of a higher manufacturing efficiency.

For example, a sound-proof product, such as a dash silencer or a floor silencer for vehicles, generally takes the form of a thin plate, which is also formed with many bent portions. Accordingly, the cavity of a mold used for forming the sound-proof product is also shaped like a thin plate having a cross section including many bent portions or corners. The processed material to be injected into the mold, on the other hand, consists principally of non-metallic shredder residue such as soft urethane foam, a fibrous binder, and so forth, and is thus likely to deform under compression.

Upon injection of the processed material into the mold, therefore, numerous air holes or blowholes appear in the cavity of the mold, and the processed material is particularly likely to be caught by and accumulated at bent portions in cross section, thus causing the problems as follows.

(1) Since the entire cavity needs to be filled with the processed material against the above-described accumulation phenomenon, it takes a relatively long time to inject the processed material into the cavity, resulting in an increased molding cycle time.

(2) The processed material is more likely to be accumulated in some parts of the cavity, and less likely to be accumulated in other parts of the cavity, resulting in reduced uniformity in the filling density of the processed material. Consequently, defectives are likely to be produced which suffer from ununiformity in the strength of the sound-proof product and sound-proof characteristics as measured at different portions of the member after molding.

(3) Since the above problems (1), (2) are caused by the thin, wide shape of the cavity with many bent portions in cross section, the sound-proof product, in particular, a small-thickness portion thereof, must be designed with a considerably reduced degree of freedom, so as to avoid these problems as far as possible.

The present invention aims at solving the above-described problems in a method for manufacturing sound-proof products, wherein a processed material comprising a mixture of chip-like solid matters of a lightweight material and a fibrous binder is injected with the air into a mold so as to fill the mold, and the sound-proof product is molded by hot press. The hot press is to press a heated material by a heated apparatus, to press a heated material by an apparatus which is not heated, or to press a material which is not heated by a heated apparatus and so on.

SUMMARY OF THE INVENTION

The present invention has been developed in the light of the above-described situations. It is therefore an object of the present invention to provide a method for manufacturing a sound-proof product wherein a processed material is injected into a preform mold without causing air holes or blowholes to appear in the cavity, and without causing accumulation of the processed material at bent portions of the cavity in cross section. It is also an object of the invention to provide a sound-proof product manufactured by the above method.

To accomplish the above object, the present invention provides a method for manufacturing a sound-proof product, in which a processed material as a mixture of chip-like solid matters made of a lightweight material and a thermoplastic fibrous binder is injected with the air into a preform mold having a molding surface that is designed for preliminary molding prior to main molding, to effect preform molding, and a preformed mass formed by the preform molding is fed to a main mold having a molding surface corresponding to the shape of the sound-proof product, and subjected to main molding by hot press, to provide the sound-proof product.

The cavity of the preform mold with a molding surface having a simpler shape (e.g., a flat shape or generally flat shape) than that of the main mold may be shaped in the form of a thin plate, but does not include bent portions in cross section thereof. When the processed material is injected into the preform mold so as to fill the mold, therefore, air holes are not generated in the cavity, and the processed material is not accumulated at bent portions of the cavity in cross section.

Consequently, the process of injecting the processed material can be quickly and smoothly implemented, with a result of reduced molding cycle time, which is advantageous in view of the problem (1) as described above. With regard to the problem (2), there is no local portion(s) in the cavity at which the processed material is particularly likely to be accumulated, and therefore the filling density of the processed material is made uniform. It is thus possible to produce a sound-proof product having uniform strength and sound-proof characteristics in respective portions thereof. With regard to the problem (3), the sound-proof product, in particular, its portion(s) to be formed with a small thickness, can be designed with an increased degree of freedom.

In one preferred form of the invention, an opened and disintegrated material is formed by holding a material in which the chip-like solid matters made of a lightweight material are bound by the fibrous binder, in a compressed state, and at the same time scraping a small amount of the material at a time, and an opened and crushed material may be formed by crushing the opened and disintegrated material. The opened and crushed material is then put into a sound-proof product manufacturing line having a molding process, as the chip-like solid matters.

In another preferred form of the invention, the processed material is formed by holding a laminated structure including upper and lower layers comprising the chip-like solid matters and an intermediate layer comprising the fibrous binder, in a compressed state, and at the same time scraping a small amount of the laminated structure at a time.

In a further preferred form of the invention, the processed material is injected with the air into the preform mold to fill the preform mold, and the amount of the air blowing into the mold is reduced with an increase in blowing resistance as the preform mold is filled with the processed material.

In a still further preferred form of the invention, the processed material and the mold are heated in the molding process, and subsequently cooled so as to allow the formed article to be taken out of the mold, by passing hot air and cold air, respectively, through vent holes that are open to molding surfaces of upper and lower sections of the mold.

The present invention also provides a sound-proof product manufactured by the above manufacturing method.

DETAILED DESCRIPTION OF THE PREFERRED EMBODIMENTS

Figure 1A:
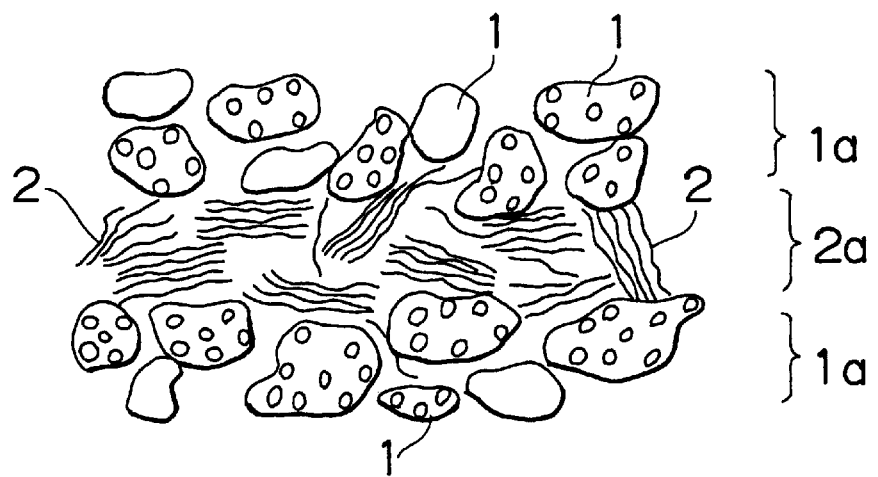
FIG. 1A is a view showing the state of a mass before an unweaving and mixing process.

A sound-proof product according to one embodiment of the present invention principally consists of chip-like solid matters made of a lightweight material. A typical example of the chip-like solid matters is non-metallic shredder residue obtained by removing metal, glass pieces, wire harness and others from shredder residue composed of wastes of vehicles. The sound-proof product is particularly preferably formed of fine shredder residue mainly consisting of urethane foam and fibers that are extracted from waste of vehicles.

In the above case, the majority of the chip-like solid matters of a lightweight material consists of pieces of plastic foam, such as urethane foam, and the rest consists mainly of fibers. The fibers contained in the chip-like solid matters include pieces or fiber layers of a fabric previously used as a seat skin, or the like. The material for sound-proof products may further contain a slight amount of minute pieces of metal, glass, and the like, provided that they do not impede the process of manufacturing a sound-proof product and do not deteriorate the quality of resulting sound-proof products.

In addition, trimmed waste or defectives of sound-proof products which appear in the manufacturing process of the present invention as described later may be opened and crushed, and thus reused as a material for sound-proof products. The sound-proof material may also be prepared by recycling wastes originating from other industrial fields, in addition to the above-indicated non-metallic shredder residue available from waste of vehicles. In some cases, chip-like solid matters may be prepared using new materials, such as plastic, rubber, and wood, for use in the sound-proof material.

The chip-like solid matters are not limited to any particular shape and size. To improve the processing efficiency and form desirable sound-proof products, it is preferable that the chip-like solid matters are not shaped (in the form of a film, fibers, or the like) to provide an extremely large aspect ratio, and that the average particle size of the chips is equal to or smaller than about 20 mm.

A fibrous thermoplastic resin is generally used as a fibrous binder having thermal plasticity. The fibrous binder may also be formed of other thermoplastic materials, such as thermoplastic rubber, in addition to the resin. It is particularly preferable to use a fibrous binder having a sheath-core structure, which consists of a low-melting-point sheath portion that melts during hot forming of the sound-proof material, and a high-melting-point core portion that does not melt during hot forming of the sound-proof material.

The form of fibers and fiber length in the fibrous binder are not limited to any particular ones. Typical forms of the fibers include cotton-like fibers in the form of tags in which relatively long fibers are twisted around each other, or bundled fibers consisting of relatively short fibers that are bundled together. As a relationship with the size of the chip-like solid matters to be bound by the fibrous binder, it is preferable that the fiber length and the average particle size of the chips be substantially equal to each other, so as to assure improved uniformity in the mixture of chips and fibers, and accordingly improved uniformity in its sound-proof characteristic.

The chip-like solid matters are bound together into a three-dimensional net-like structure by means of the fibrous binder, to provide sound-proof products suitably used as vehicle sound-proof products, such as a dash silencer and a floor silencer, and other types of sound-proof products.

In the manufacture of dash silencers for vehicles, for example, it is generally considered to determine the amount of the fibrous binder Y to be used relative to the material X consisting of the chip-like solid matters such that the weight ratio of X:Y is about 8:2 or lower (with a larger amount of Y). According to the present invention, on the other hand, the fibrous binder is desirably opened and extremely finely dispersed and mixed with the chip-like solid matters, and therefore the amount of the fibrous binder Y may be reduced such that the weight ratio of X:Y is about 9:1. It is, however, to be understood that the amount of the fibrous binder used is not particularly limited.

The mixing process in the present invention is a process of mixing a material principally consisting of chip-like solid matters of a lightweight material, with a thermoplastic fibrous binder. This process includes a step of preparing a laminated structure having upper and lower layers composed of the chip-like solid matters and an intermediate layer composed of the fibrous binder, and an unweaving and mixing process as described later.

In the unweaving and mixing process during the mixing process, a laminated structure consisting of chip-like solid matters and fibrous binder held in a compressed state is prepared, and the laminated structure is scraped by a small amount at a time by means of a scraping member with projections. Upon each scraping action, a small amount of fibrous binder is scraped off while being torn and finely opened, and at the same time a small amount of chip-like solid matters are scraped off. As a result, the opened fibrous binder twines around or surrounds the individual chip-like solid matters.

In the mixture obtained by scraping (which will be called "opened and mixed material"), therefore, the chip-like solid matters and the fibrous binder are finely and uniformly dispersed and mixed together while the opened fibrous binder twines around the individual chip-like solid matters.

The chip-like solid matters and fibrous binder are fed to the scraping stage as a laminated structure consisting of upper and lower layers composed of chip-like solid matters, and an intermediate layer composed of a fibrous binder having a considerably small specific gravity. Accordingly, the chip-like solid matters and fibrous binder, which have been scraped off the laminated structure, are quite uniformly dispersed and mixed together, without causing variations in the distribution density due to a difference in the specific gravity.

Figure 1B:
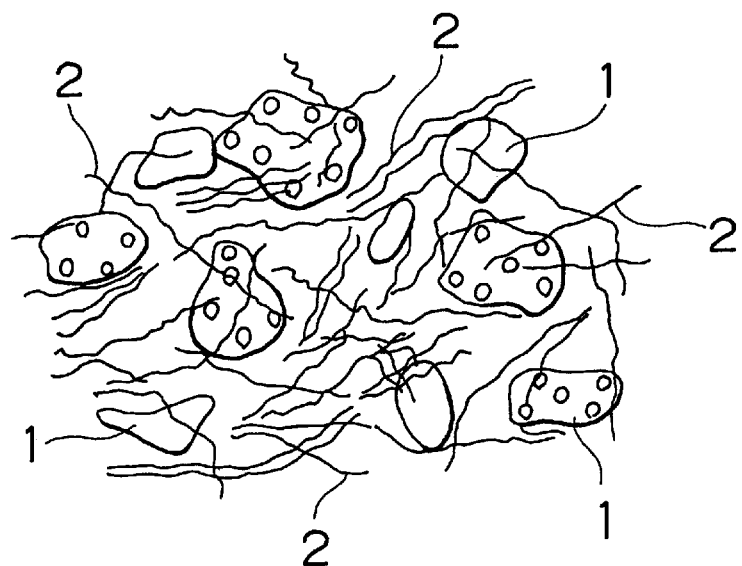
FIG. 1B is a view showing the state of a mass after the unweaving and mixing process.

FIG. 1A and FIG. 1B illustrate images of two different states of the material as described above. FIG. 1A shows a laminated structure of chip-like solid matters 1 and a fibrous binder 2 prior to the unweaving and mixing process, in which the fibers of the fibrous binder 2 constitute a sheet-like intermediate layer 2a, which is sandwiched between the upper and lower layers 1a composed of the chip-like solid matters 1. The intermediate layer 2a and upper and lower layers 1a are scraped off the laminated structure while they are actually held in a compactly compressed state.

FIG. 1B shows the state of the opened and mixed material in which the fibrous binder 2 of the intermediate layer 2a is finely opened through scraping operations, and the thus opened fibers twine around the individual chip-like solid matters 1 that used to constitute the upper and lower layers 1a. In this condition, the chip-like solid matters and the fibrous binder are quite finely and uniformly dispersed and mixed together.

The opened and mixed material obtained in the above manner is then fed to a binding process, so as to form a sound-proof product which shows originally designed degrees of sound-proof capability, strength, and shape holding property, and which are free from variations in the quality from one portion to another.

Suppose the chip-like solid matters and fibrous binder are fed to the scraping stage as a two-layer structure in which the chip-like solid matters are dispersed on a sheet of fibrous binder that has not been opened. Although the chip-like solid matters and the fibrous binder are both finely and uniformly dispersed and mixed together, the degree of uniform dispersion and mixing is not as high as that in the case of the laminated structure as shown in FIG. 1A, because of the absence of chip-like solid matters that constitute the upper layer on the fibrous binder.

The laminated structure may be constructed in any fashion provided the fibrous binder as an intermediate layer is sandwiched or interposed between the upper and lower layers composed of chip-like solid matters. For example, the laminated structure may be a three-layer sandwich structure as shown in FIG. 1A, or a five-layer or larger even-layer sandwich structure having a similar construction. The construction of the laminated structure may be varied depending upon the required amounts and types of the ingredients to be mixed.

As a pretreatment to formation of a laminated structure, the chip-like solid matters supplied as a mass of shredder residue may be dispersed by means of a rotary cylinder, or the like, having needle-like projections on a circumferential surface thereof, or the fibrous binder may be opened in advance by an unweaving machine. These pretreatments are preferable, but not indispensable.

The method of forming the laminated structure is not limited to any particular method. For example, while transport means, such as a belt conveyer, for feeding a laminated structure to the unweaving and mixing process is being operated, chip-like solid matters are initially supplied from a first hopper, or the like, located on a conveyer surface on the most upstream side of the conveyer, so as to form the lower layer. Then, a fibrous binder is supplied from a second hopper, or the like, located on a conveyer surface downstream of the first hopper, so as to form the intermediate layer. In addition, chip-like solid matters are supplied from a third hopper, or the like, located on a conveyer surface downstream of the second hopper, so as to form the upper layer. In this manner, the laminated structure can be easily formed.

The unweaving and mixing process is a process of scraping the above-described laminated structure consisting of the chip-like solid matters and fibrous binder held in a compressed state, by means of a scraping member with projections, such that only a small amount of the structure is taken away for each scraping action.

The manner of holding the laminated structure in a compressed state is not limited to any particular one as long as the purpose is accomplished. A typical example is that the laminated structure carried by a suitable transport means is caused to pass through a clearance between a pair of rollers, and pushed out of the rollers while being compressed. In the present embodiment, the laminated structure pushed out of the rotating rollers is scraped by a small amount at a time by means of a scraping member with projections, for example, a rotary cylinder having needle-like projections on a circumferential surface thereof. In a particularly preferable method, the laminated structure consisting of the upper and lower layers formed of chip-like solid matters and the intermediate layer formed of a fibrous binder is held in a compressed state, and a small amount of the laminated structure is scraped at a time. With this method, the chip-like solid matters and the fibrous binder that has been finely opened are extremely finely and uniformly dispersed and mixed together, and therefore the chip-like solid matters can be uniformly and favorably bound together in a subsequent hot press process.

In another method using a pair of reciprocating-type pressure members equipped with a transverse feed mechanism, the laminated structure is bound in a compressed state between the pressure members such that a part of it protrudes or extends outwardly of the pressure members, and the protruding part is scraped off the laminated structure. After the scraping step, the binding force exerted on the laminated structure is released, and the pressure members are fed in the transverse direction so that another part of the structure extends outwardly of the pressure members. Thus, the laminated structure is intermittently scraped by repeating the above operations.

The scraping manner using a scraping member with projections is not limited to any particular one as long as the purpose is accomplished. For example, a scraping member, which is of reciprocating type and provided with a comb-like projection, may be used for successively scraping a small amount of the laminated structure that is fed while being held in a compressed state.

In the opened and mixed material that has been subjected to the unweaving and mixing process, the chip-like solid matters and the fibrous binder that has been finely opened by external force are extremely finely and uniformly dispersed and mixed together. The thus processed material may be then immediately fed to the next process step for manufacturing sound-proof products. Alternatively, the processed material may be temporarily stored in a hopper, or the like, and then a required amount of the material may be supplied to a blowing-filling process. In this case, the hopper may be provided at its supply port with a supply-port opening adjusting mechanism that is able to adjust the amount of the processed material to be supplied.

In one method of filling a mold with the processed material, a pressurized gas generated by, for example, a blower is used for carrying the processed material and blowing it into the mold. The mold used in this case generally consists of the upper section and the lower section that are separable from each other, and an air inlet is formed at a particular part (generally, a center part of the upper section) of the mold. Also, a mesh plate, which surrounds at least side surfaces of the mold so as to cover opening space, serves to hold the processed material within the mold while allowing the blowing air to escape or pass through the mesh. The molding surfaces of the upper and lower molds may also be provided by mesh plates.

The filling of the mold with the processed material starts with a portion of the mold adjacent to the mesh plate surrounding the periphery of the mold, and then proceeds toward a portion thereof adjacent to the air inlet, and the blowing resistance gradually increases as the filling process proceeds. At this time, the processed material receives the filling pressure by undergoing compression deformation in response to an increase in the blowing resistance, and therefore the filling pressure is inhibited from being transmitted to end portions of the mold cavity. Consequently, the filling density of the processed material increases toward a center portion of the cavity, while the filling pressure is not transmitted to end portions of the cavity. To solve this problem, it is effective to control the amount of the air blowing into the mold by reducing the same in response to an increase in the blowing resistance. If the amount of the air blowing into the mold is reduced as the filling of the processed material proceeds and the blowing resistance increases, the whole cavity of the mold extending from the end portions near the air vent (mesh) to the center portion near the air inlet is constantly filled with the processed material under the same filling pressure, i.e., under a pressure applied to the material during the filling process. Thus, the filling density of the processed material is made uniform over the entire cavity of the mold, thus making it possible to form an excellent sound-proof product that is free from variations in the strength and sound-proof capability from one portion of the member to another.

The above control for reducing the amount of blowing air may be implemented by various methods, particularly preferably, (1) by sensing increases in the blowing resistance with time by a suitable sensor, and controlling means for adjusting the amount of blowing air in a feedback manner, based on sensed values, or (2) by acquiring standard data of increases in the blowing resistance with time and corresponding reductions in the amount of blowing air in an experiment under the same conditions, and controlling the above adjusting means based on the data. In either of the above-described methods (1), (2), the amount of blowing air may be reduced in a controlled manner through automatic control or manual control.

More specifically, the amount of blowing air may be adjusted by adjusting the speed of rotation of the air blower, for example. In this case, the amount of the processed material injected into the mold with the air may also be reduced with the reduction in the amount of the blowing air, or the amount of the processed material supplied to the mold may be kept constant by increasing the opening of the supply port of the hopper, or the like, in accordance with the reduction in the amount of the blowing air, so as to avoid a reduction in the filling speed.

After the filling of the mold with the processed material is completed, the processed material is subjected to hot press for binding the chip-like solid matters utilizing thermal fusion of the fibrous binder, and performing press molding on the sound-proof material. To this end, two or more molds are installed in position, and hot press is performed on the processed material that has already filled one of the molds while the other mold is being filled with the processed material. Thus, the molding process using two or more molds can realize a system having a high manufacturing efficiency.

The mold to be filled by blowing with the processed material may be a preform mold disposed upstream of a main mold along the production line for use in preform molding as a pretreatment to main molding, or may be an ordinary main mold in which a sound-proof material is generally molded or shaped.

In the present embodiment, the processed material is injected with the air into a preform mold, to fill the preform mold with molding surfaces having a simple shape (for example, a flat or generally flat shape), unlike a complicated shape of the final sound-proof product or product. The processed material is then formed into a preformed mass by weak hot press using the preform mold, thus assuring an increased blowing/filling speed and enhanced uniformity in the filling density. The preformed mass is then fed to the main mold and subjected to powerful hot press, so that the resulting sound-proof product is given a desired binding strength and a complicated shape.

The preform mold consists of an upper section and a lower section that are separable from each other and permit press operations, and the molding surfaces of the upper and lower sections have a simpler shape (for example, flat or generally flat shape) than those of the main mold. The molding surfaces of the preform mold, however, may include recesses or protrusions having relatively gentle slopes as side walls, so as to provide the preformed mass with large-thickness portion(s) and/or small-thickness portion(s) (with no bent portions or corners in cross section).

The construction of the preform mold is not limited to any particular one as long as the above conditions are satisfied. As will be illustrated by way of example in a preferred embodiment of the invention, the preform mold is generally constructed such that an air inlet is formed at a particular portion (generally, a center portion of the upper mold), and a mesh plate surrounds the side surfaces of the mold so as to cover the opening space, so that the processed material can be kept within the mold while the blowing air is allowed to escape through the mesh plate. The molding surfaces of the upper and lower molds may also be provided by mesh plates.

The preform mold is preferably provided with heating and cooling devices, so that hot press can be lightly performed on the processed material that fills the preform mold. In this case, the hot press is carried out to such an extent that gives the preformed mass with integrality high enough to maintain its original shape when the preformed mass is fed from the preform mold to the main mold, while at the same time allowing re-shaping of the preformed mass in the main molding step with a sufficient degree of freedom.

To fill the preform mold with the processed material, a pressurized gas generated by, for example, a blower is used for carrying the processed material and blowing it into the mold. Since the molding surfaces of the upper and lower sections of the preform mold have a simple shape, the processed material quickly and smoothly fills the preform mold in a direction from a portion of the mold near the air vent (mesh plate), toward its portion near the air inlet through which the processed material is injected.

The main mold is disposed downstream of the preform mold along the production line, and a transport means for carrying the preformed mass is provided between the preform mold and the main mold. The transport means may be of any type, or may be selected from, for example, a feed-type belt conveyer, roller conveyer, and the like, more preferably, a pull-type clamp, or the like, that is adapted to grip a distal end portion of the preformed mass and pull it into the main mold so as to more desirably maintain the shape of the preformed mass during transport thereof. The feed-type conveyer and the pull-type clamp may be both used along the same line. Since the preformed mass is given certain integrality as described above, it can maintain and follow its original shape during the transport operation.

The main mold also consists of the upper section and the lower section that are separable from each other, and permits at least hot press operations. The molding surfaces of the upper and lower sections of the main mold have a certain complicated shape corresponding to the shape of the sound-proof product to be finally formed.

The above-described preform mold and the main mold are preferably equipped with a mechanism that effects heating and subsequent cooling, so that heating and cooling are efficiently repeated in successive molding cycles. In particular, the processed material to be shaped, which consists of chip-like solid matters and fibrous binder injected into the mold cavity, is readily permeable to the air, and fills the mold in the form of a thin plate as a whole. As a method of heating and cooling, therefore, hot air for heating or cold air for cooling is caused to permeate through the processed material contained in the mold in the form of a thin plate, in the direction of the thickness thereof.

More specifically, numerous vent holes are formed through the upper and lower sections of the mold, such that one end of each vent hole is open to the corresponding molding surface, and the other end communicates with a corresponding one of heating/cooling boxes A, B respectively mounted on the upper and lower molds. In operation, hot air upon heating of the mold, or cold air upon cooling of the mold, is caused to flow from one of the heating/cooling boxes A/B to the other cooling/heating box B/A By this method, the processed material filling the mold and the upper and lower sections of the mold can be rapidly heated or cooled.

More preferably, the direction in which hot air flows upon heating is set to be opposite to the direction in which cold air flows upon cooling. Namely, hot air is sent from the heating/cooling box A to the heating/cooling box B through the mold vent holes upon heating of the mold, and cold air is sent from the heating/cooling box B to the heating/cooling box A through the mold vent holes upon cooling of the mold. With this method, when hot air or cold air passes through the vent holes of the upper or lower mold located on the side of the air inlet, heat exchange between the hot/cold air and the mold can be reduced as much as possible, and therefore the hot or cold air can reach the processed material while maintaining its temperature, thus permitting rapid heating or cooling.

While one set of preform mold and main mold may be arranged with respect to a single processed-material injection device, a plurality of lines of preform mold and main mold may be arranged so as to diverge from a single processed-material injection device, thus providing a system having a high production efficiency. In this system, preform molding is performed on the processed material already loaded in a preform mold on one branch line while a preform mold on another branch line is being filled with the processed material.

The sound-proof material that has been shaped in the manner as described above is then finished in a trimming process in which an edge material is removed by cutting. The trimming process may be placed in series with the preform and main molding processes.

In the next step, edge materials that appear in the trimming process (or molding defectives) are reused as a material of the chip-like solid matters. In this reuse or recycle process, the edge material is initially opened, and then shredded, to be thus crashed into pieces having a certain particle size. With this process, the opened and disintegrated material as an aggregate of small disintegrated pieces released from a three-dimensional net-like binding structure is crushed into a suitable particle size, and reused as a material equivalent to chip-like solid matters originating from an ordinary non-metallic shredder residue, as described above.

Here, the material consisting of chip-like solid matters made of a lightweight material, including the above opened and disintegrated material, is mixed with a thermoplastic fibrous binder in the mixing process as described above. The thus processed material is then fed to the molding process in which the material is injected into the mold for filling, and thus shaped by hot press into a desired shape of the sound-proof product.

As a result of the process as described above, favorable chip-like solid matters are regenerated which are sufficiently released from the three-dimensional net-like binding structure of the chip-like solid matters and fibrous binder and which have a suitable particle size. When the regenerated material is thrown back into the manufacturing line of sound-proof products, therefore, it can be finely and uniformly mixed with a new fibrous binder material, so as to reconstruct a fine binding structure in the form of a three-dimensional mesh. It is thus possible to manufacture sound-proof products that are free from poor binding in local parts thereof and exhibit high strength and excellent sound-proof capability.

Where the unnecessary part of the sound-proof material is processed in the reverse order relative to the above order, namely, if the unnecessary material is initially crushed by a shredder, and then subjected to an unweaving and disintegrating process using a scraping member with projections, it is not possible to regenerate favorable chip-like solid matters as described above. If the particles of the chip-like solid matters are crushed into a small particle size while leaving a net-like binding structure, it becomes difficult to hold the particles in the compressed state, thus making it difficult to sufficiently release the particles from a net-like binding structure by means of the scraping member with projections.

In the above-described molding process (the main molding process where preform molding and main molding are both performed), the formed article may be moved to a trim mold for trimming after molding of the sound-proof material is completed. Alternatively, the main mold may be adapted to perform a trimming function, so that molding or shaping of the sound-proof material by hot press and trimming can be accomplished at the same time. This leads to a simplified arrangement of the line for manufacturing sound-proof products, and an improved efficiency in the manufacture of sound-proof products, including reuse of the unnecessary material.

No matter which method is employed for trimming, a trimmed layer resulting from the trimming process is immediately supplied to the unweaving and disintegrating process and unweaving and crashing process, whereby the trimmed layer can be recycled with no time lag, to thus provide a manufacturing line of sound-proof products on which no trimmed layer appears. Similarly, no defectives of sound-proof products appears on the manufacturing line.

Figure 2:
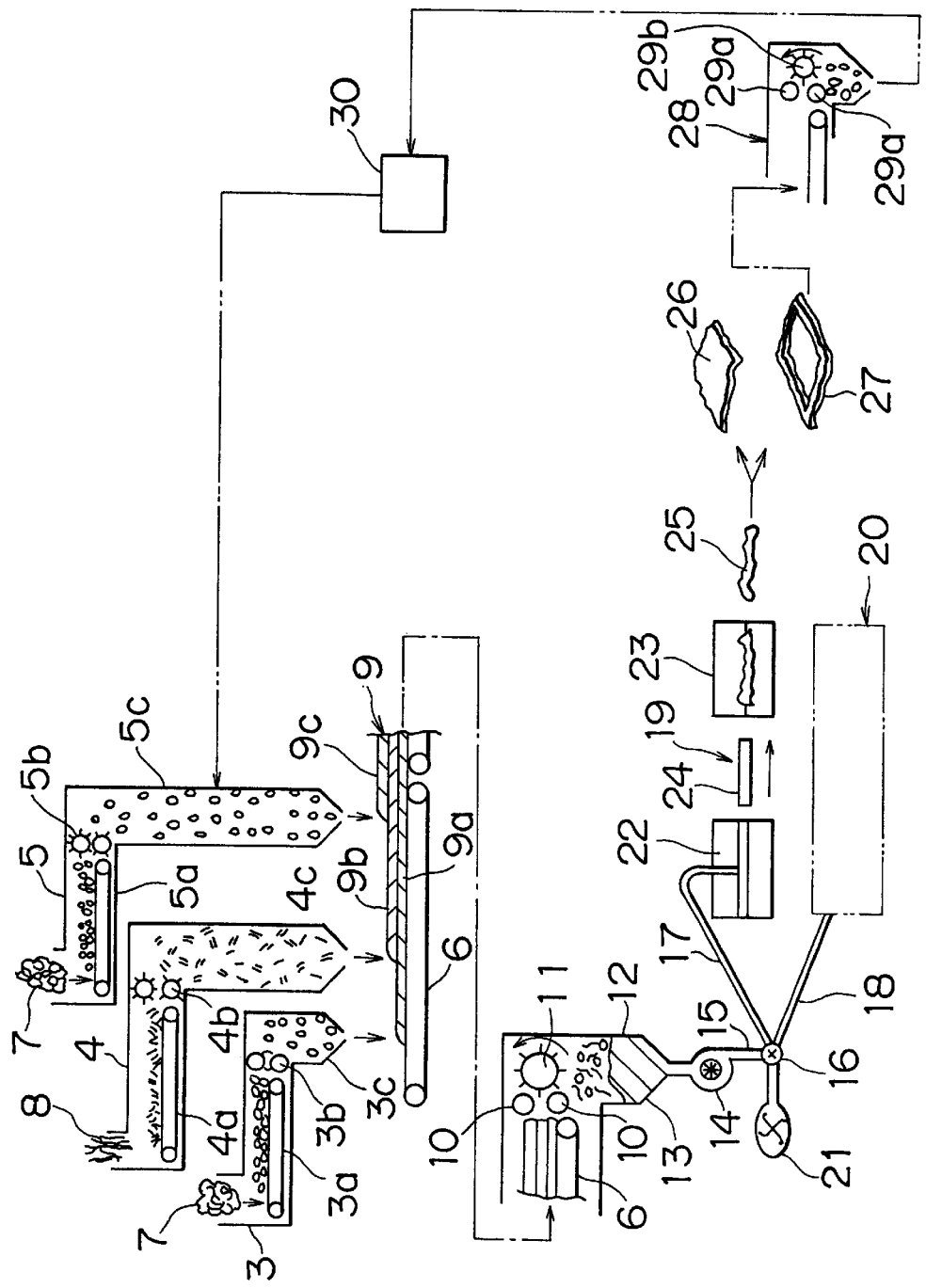
FIG. 2 is a view showing a process of manufacturing a sound-proof product according to one embodiment of the present invention.

One preferred embodiment of the present invention will be described with reference to FIG. 2 schematically showing one example of the process flow.

Three material supply sites 3, 4, 5 as shown in FIG. 2 are located above a carrier surface of a belt conveyer 6 for transporting a laminated structure to be formed, at three successive positions as viewed from the upstream side to the downstream side in the feed direction. The material supply sites 3, 4, 5 include conveyer belts 3a, 4a, 5a, respective pairs of rotary cylinders 3b, 4b, 5b, and hoppers 3c, 4c, 5c, respectively.

A mass 7 of non-metallic shredder residue (consisting of plastic foam, non-foam plastic, pieces of rubber, and so forth) having an average particle size of about 5 mm is supplied to each of the upstream-side material supply site 3 and downstream-side material supply site 5. To the intermediate material supply site 4 is supplied a mass 8 of fibrous binder that has not been opened, which binder consists of polyester short fibers of a sheath-core structure having an average fiber length of 10 mm.

In the present embodiment, the ratio of the total supply amount of the mass 7 (X) of non-metallic shredder residue to the supply amount of the mass 8 (Y) of the fibrous binder, i.e., X:Y (weight ratio) is about 9:1 by weight.

These masses 7, 8 are fed to the rotary cylinders 3b, 4b, 5b by the conveyer belts 3a, 4a, 5a. The mass 7 of shredder residue is loosened or unwound (dispersed into individual chip-like solid matters), and the mass 8 of fibrous binder is opened. These masses 7, 8 are respectively supplied to the hoppers 3c, 4c, 5c, and successively deposited on the carrier surface of the belt conveyer 6 to form a lower layer 9a, an intermediate layer 9b and an upper layer 9c, which constitute a three-layer laminated structure 9.

Next, the laminated structure 9 is fed to a clearance between a pair of rollers 10, 10 that rotate in synchronism with the belt conveyer 6. The size of the clearance between the pair of rollers 10, 10 is set to be much smaller than the thickness of the laminar structure 9 deposited on the belt conveyer 6, and therefore the laminar structure 9 is brought into the compressed state by the rollers 10, 10 when passing through the clearance between the rollers 10, 10.

A rotary cylinder 11 having a large number of needle-like projections on a circumferentail surface thereof is mounted just ahead of the rollers 10, 10 as viewed in the feed direction, with almost no space between the rollers 10, 10 and the cylinder 11. In operation, the rotary cylinder 11 rotates in the direction of the arrow as seen in FIG. 2.

With the above arrangement, the laminated structure 9 that is still held in the compressed state is scraped by a small amount at a time by the needle-like projections of the rotary cylinder 11 immediately after passing through the clearance between the rollers 10, 10.

Upon scraping of the laminated structure 9, the fibrous binder of the intermediate layer 9b is forced to be torn off by a smaller amount at a time while being finely opened, and at the same time the chip-like solid matters of the upper and lower layers 9a, 9c are also scraped by a small amount at a time. As a result, the fibrous binder that has been opened twines around the individual chip-like solid matters. In the opened and mixed material 12 that is accumulated at the bottom as a result of scraping, the chip-like solid matters 1 and the fibrous binder 2 that has been opened are considerably finely and uniformly dispersed and mixed together, as shown in FIG. 1B In the process as described above, the mixed state of the opened and mixed material 12 in which the chip-like solid matters 1 and the fibrous binder 2 are finely and uniformly dispersed can be finely adjusted to varying degrees as desired, by adjusting the thickness of the laminated structure 9 deposited on the belt conveyer 6, the feed speed of the belt conveyer 6, the rotating speed of the rollers 10, 10 and the rotating speed of the rotary cylinder 11.

The opened and mixed material 12 is temporarily accumulated or stored in a vessel 13, and then a required amount of the processed material 12 for each loading, which amount is controlled by suitable supply amount control means (not shown) provided in the vessel 13, is fed to a molding apparatus, and supplied to the transport/filling process and molding process.

The molding apparatus includes a blower 14 connected to the vessel 13, a main duct 15 that extends from the blower 14, two branch ducts 17, 18 that branch out from the main duct 15 via a switching valve 16, two molding sites 19, 20 provided at respective distal ends of the branch ducts 17, 18, and a cold/hot air blower 21 connected to the switching valve 16 through a duct. The molding site 20, having the same construction as the molding site 19, will not be illustrated in FIG. 2 nor described in detail.

In the molding site 19, which is merely simply illustrated in FIG. 2, a preform mold 22 having simpler molding surfaces than those for main molding, and a main mold 23 having molding surfaces corresponding to the actual shape of sound-proof product are disposed at two successive locations along the manufacturing line.

Figure 3:
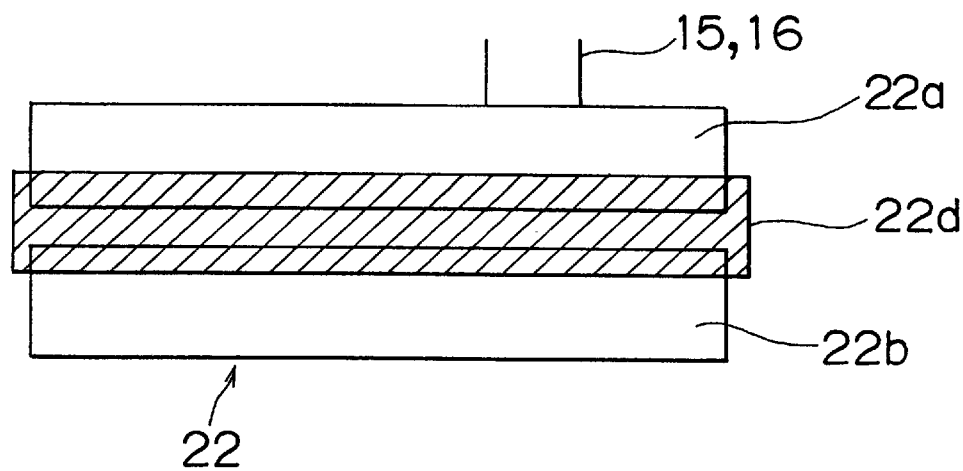
FIG. 3 is a view showing the construction of a preform mold used in the embodiment.

Each of the preform mold 22 and the main mold 23 consists of the upper section and the lower section that are separable from each other and permit press molding. In the preform mold 22 as shown in greater detail in FIG. 3, an air inlet (not shown) is formed through the upper section 22a connected with the above-indicated branch duct 17, 18, and a metallic mesh plate 22d surrounds the side surfaces of the upper section 22a and the lower section 22b so as to cover the opening space between the upper and lower sections. The metallic mesh plate 22d serves to keep the opened and mixed material 10 within the mold, while allowing the air to escape from the mold. The molding surfaces of the upper section 22a and lower section 22b may also be provided by mesh plates.

Figure 4:
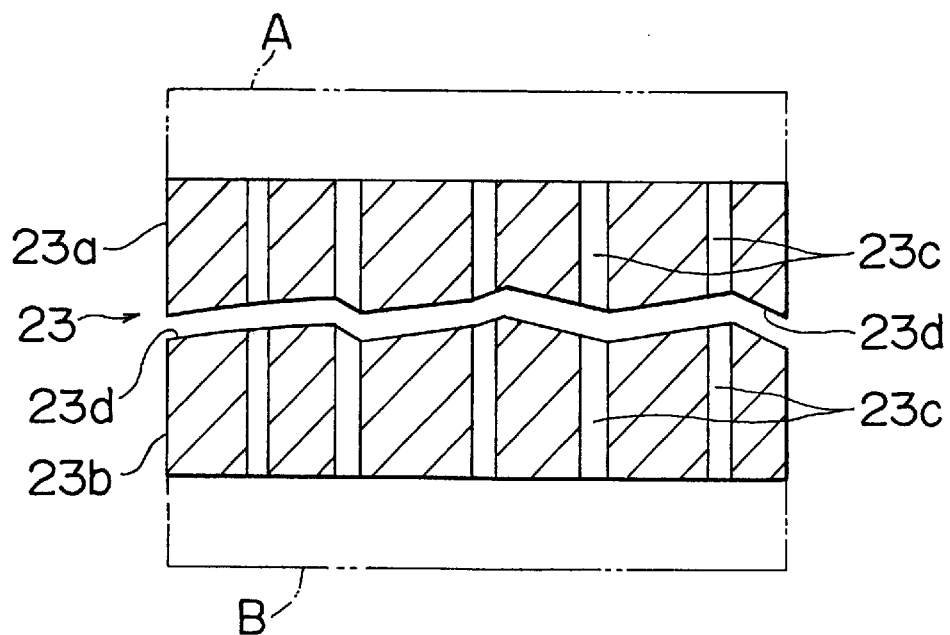
FIG. 4 is a cross sectional view showing the construction of the main mold used in the embodiment.

As shown in FIG. 4, the main mold 23 consists of an upper section 23a and a lower section 23b, which are respectively formed with numerous vent holes 23c that are open to the molding surfaces. The vent holes 23c communicate with heating/cooling boxes A, B mounted on the upper section 23a and lower section 23b, respectively. Although not illustrated in the figures, the preform mold 22 is also provided with a similar heating/cooling system.

Upon heating for hot press, hot air is sent from the heating/cooling box A to the heating/cooling box B through the vent holes 22c, passing through the opened and mixed material in the direction of the thickness thereof. Upon cooling for allowing the formed article to be taken out from the mold, cold air is sent from the heating/cooling box B to the heating/cooling box A along the reverse path. In this manner, the processed material and/or the mold can be rapidly heated or cooled with a high thermal efficiency.

The hot press is relatively lightly performed in the preform mold 22, to such an extent that the chip-like solid matters are lightly bound to each other due to some degree of thermal fusion of the fibrous binder, and the preformed mass 24 is given integrality high enough to maintain its shape when it is fed from the preform mold to the main mold. In the main mold 23, on the other hand, molding is carried out with sufficiently high press pressure and heating, so as to provide a main formed article 25.

In general, when a sound-proof product shaped with complex recesses and protrusions is to be formed by blowing-molding, the cavity assumes a complicated shape with many corners or bent portions, and it is thus difficult to fill the cavity with the opened and mixed material with a uniform density in both directions of the width and thickness of the mold, causing a large number of air holes or blow-holes to appear in the cavity.

In the present embodiment, however, the opened and mixed material is pressed in the preform mold 22 while being heated at a relatively low temperature, to thus form a preformed mass 24 having a generally flat shape that is simpler than that of main molding. The preformed mass 24 is then loaded into the main mold 23 in which the mass 24 is pressed and heated as needed so as to provide a main formed article. In this manner, the above-described problem can be solved.

The preform mold 22 is provided at an appropriate position with a blowing resistance sensor (not shown) of air pressure sensing type. In response to gradual increases in the blowing resistance as the opened and mixed material is injected into the preform mold 22 to fill the same, values representing the blowing resistance are fed back to the blower 14, so that the amount of the blowing air from the blower can be gradually reduced.

Consequently, the blowing resistance is kept at a certain level, and the preform mold 20 is filled with the opened and mixed material, assuring a sufficiently high uniformity in the filling density. It is thus possible to manufacture sound-proof products of even higher quality.

The opened and mixed material is fed under pressure with the air supplied by the blower 14, and thus injected into either of the two molding sites 19, 20 via the switching valve 16. While preform molding and main molding are performed in the molding site 19, therefore, the opened and mixed material may be injected into the preform mold 22 in the other molding site 20.

In the above manner, the transport/filling process and molding process are repeated while effectively utilizing the switching valve 16, such that different phases of the process go on at the same time in a plurality of molds. This leads to a reduction in play time of each mold, and improved efficiency in molding cycles.

The preformed mass 24 is formed under required pressure and heat into the shape of actual sound-proof product, and solidified in the main mold 23 to provide a main formed article 25, which is then trimmed by a trim mold (not shown) to be divided into a sound-proof product 26 and a trimed waste 27. It is, however, to be understood that trimming may be performed at the same time as hot press molding in the main mold 23, assuring a further improved manufacturing efficiency.

The trimed waste 27 is put into a recycle site 28. The recycle site 28 is provided with a pair of rollers 29a, 29a and a rotary cylinder 29b having needle-like projections, which are similar in construction to the rollers and rotary cylinder used in the unweaving and mixing process as described above.

With the above arrangement, the trimed waste 27 (to which defectives or wastes of sound-proof products may be added) is caused to pass through a clearance between the pair of rollers 29a, 29a while being held in the compressed state. Immediately after passing the rollers 29a, 29a, the trimed waste 27, which is still in the compressed state, is scraped by a small amount at a time by means of the needle-like projections of the rotary cylinder 29b, to provide an opened and disintegrated material.

The opened and disintegrated material is then put into a shredder 30 (that is simply denoted in FIG. 2), to provide an opened and crushed material, which is recovered as suitable chip-like solid matters having the average particle size of about 5 mm. The thus obtained chip-like solid matters are then thrown into the material supply site 3 or material supply site 5. It is, however, to be understood that the trimed waste 27, defectives or wastes of sound-proof products, and the like, will not result in favorable chip-like solid matters if they are thrown into a shredder without being opened and crushed at the recycle site 28.

Also, defectives of sound-proof products that may arise in the manufacturing process may be re-used as suitable chip-like solid matters in a process similar to the above-described process using the trimed waste 27.

What is claimed is:

1. A method for manufacturing a sound-proof product comprising:

a preform molding step of performing preform molding in which a processed material as a mixture of a material principally consisting of chip-like solid matters made of urethane foam mainly and a thermoplastic fibrous binder is injected with air into a preform mold having a molding surface that is designed for preliminary molding prior to main molding;

a main molding step of feeding a preformed mass formed by the preform molding, to a main mold having a molding surface corresponding to the shape of the sound-proof product, and performing the main molding on the preformed mass by a hot press, to provide the sound-proof product;

an unweaving and disintegrating step of forming an opened and disintegrated material by holding a material in which the chip-like solid matters made of urethane foam mainly are bound by the fibrous binder, in a compressed state, and at the same time scraping a small amount of the material at a time;

an unweaving and crushing step of forming an opened and crushed material by crushing the opened and disintegrated material; and a step of putting the opened and crushed material into a sound-proof product manufacturing line as the chip-like solid matters, said sound-proof product manufacturing line having a molding process including the preform molding process and the main molding process.

2. A method for manufacturing a sound-proof product according to claim 1, wherein the processed material is lightly subjected to hot press at the time of the preform molding, so that the preformed mass is given a certain degree of integrality.

3. A method for manufacturing a sound-proof product according to claim 1, wherein said sound-proof product manufacturing line includes the molding process, a mixing process of mixing the chip-like solid matters made of a lightweight material including the opened and crushed material, with the thermoplastic fibrous binder, to provide the processed material, and a process of injecting the processed material into the preform mold with the air to fill the preform mold with the processed material.

4. A method for manufacturing a sound-proof product according to claim 3, wherein a trim layer or a defective that appears in the molding process of the sound-proof product manufacturing line is subjected to the unweaving and disintegrating step and the unweaving and crushing step, to be formed into an opened and crushed material, which is then used as the chip-like solid matters in said mixing step.

5. A method of manufacturing a sound-proof product according to claim 4, wherein molding in the shape of the sound-proof product by hot press and trimming molding are carried out at the same time in the molding process of the sound-proof product manufacturing line.

6. A method for manufacturing a sound-proof product according to claim 3, wherein molding in the shape of the sound-proof product by hot press and trimming molding are carried out at the same time in the molding process of the sound-proof product manufacturing line.

7. A method for manufacturing a sound-proof product comprising:

a preform molding step of performing preform molding in which a processed material as a mixture of a material principally consisting of chip-like solid matters made of a lightweight material and a thermoplastic fibrous binder is injected with air into a preform mold having a molding surface that is designed for preliminary molding prior to main molding; and a main molding step of feeding a preformed mass formed by the preform molding, to a main mold having a molding surface corresponding to the shape of the sound-proof product, and performing the main molding on the preformed mass by a hot press, to provide the sound-proof product;

wherein the processed material is formed by holding a laminated structure including upper and lower layers comprising the chip-like solid matters and an intermediate layer comprising the fibrous binder, in a compressed state, and at the same time scraping a small amount of the laminated structure at a time.

8. A method for manufacturing a sound-proof product according to claim 7, wherein the processed material is lightly subjected to hot press at the time of the preform molding, so that the preformed mass is given a certain degree of integrality.

9. A method for manufacturing a sound-proof product comprising a preform molding step of performing preform molding in which a processed material as a mixture of a material principally consisting of chip-like solid matters made of a lightweight material and a thermoplastic fibrous binder is injected with air into a preform mold having a molding surface that is designed for preliminary molding prior to main molding;

a main molding step of feeding a preformed mass formed by the preform molding, to a main mold having a molding surface corresponding to the shape of the sound-proof product, and performing the main molding on the preformed mass by a hot press, to provide the sound-proof product; and reducing the amount of air blowing into the preform mold with an increase in blowing resistance as the preform mold is filled with the processed material.

10. A method for manufacturing a sound-proof product according to claim 9, further comprising:

detecting increases in the blowing resistance with time, and wherein the amount of the air blowing into the preform mold is reduced by feedback controlling the amount of blowing air, based on detected values of the blowing resistance.

11. A method for manufacturing a sound-proof product according to claim 9, wherein the amount of the air blowing into the preform mold is reduced based on preliminarily acquired standard data of increases in the blowing resistance with time and corresponding reductions in the amount of blowing air.

12. A method for manufacturing a sound-proof product according to claim 9, wherein the processed material is lightly subjected to hot press at the time of the preform molding, so that the preformed mass is given a certain degree of integrality.

13. A method for manufacturing a sound-proof product comprising:

a preform molding step of performing preform molding in which a processed material as a mixture of a material principally consisting of chip-like solid matters made of a lightweight material and a thermoplastic fibrous binder is injected with air into a preform mold having a molding surface that is designed for preliminary molding prior to main molding; and a main molding step of feeding a preformed mass formed by the preform molding, to a main mold having a molding surface corresponding to the shape of the sound-proof product, and performing the main molding on the preformed mass by a hot press, to provide the sound-proof product;

wherein the processed material and the preform mold are heated in the preform molding process, and subsequently cooled so as to allow the preformed mass to be taken out of the preform mold, by passing hot air and cold air, respectively, through vent holes that are open to molding surfaces of upper and lower sections of the preform mold.

14. A method for manufacturing a sound-proof product according to claim 13, wherein the hot air for heating and the cold air for cooling are caused to flow in opposite directions.

15. A method for manufacturing a sound-proof product according to claim 13, wherein the processed material is lightly subjected to hot press at the time of the preform molding, so that the preformed mass is given a certain degree of integrality.

16. A method of manufacturing a sound-proof material comprising:

a preform molding step of performing preform molding in which a processed material as a mixture of a material principally consisting of chip-like solid matters made of a lightweight material and a thermoplastic fibrous binder is injected with air into a preform mold having a molding surface that is designed for preliminary molding prior to main molding; and a main molding step of feeding a preformed mass formed by the preform molding, to a main mold having a molding surface corresponding to the shape of the sound-proof product, and performing the main molding on the preformed mass by a hot press, to provide the sound-proof product;

wherein the processed material and the main mold are heated in the main molding process, and subsequently cooled so as to allow a main formed article to be taken out of the main mold, by passing hot air and cold air, respectively, through vent holes that are open to molding surfaces of upper and lower sections of the main mold.

17. A method for manufacturing a sound-proof product according to claim 16, wherein the hot air for heating and the cold air for cooling are caused to flow in opposite directions.

18. A method for manufacturing a sound-proof product according to claim 16, wherein the processed material is lightly subjected to hot press at the time of the preform molding, so that the preformed mass is given a certain degree of integrality.

19. A method for manufacturing a sound-proof product according to claim 1, wherein the chip-like solid matters are made of urethane foam mainly that are extracted from waste of vehicles.

* * * * *